United States Patent
Han

(10) Patent No.: US 12,536,835 B2
(45) Date of Patent: Jan. 27, 2026

(54) METHOD FOR DETERMINING EXPRESSION MODEL, ELECTRONIC DEVICE AND NON-TRANSIENT COMPUTER READABLE STORAGE MEDIUM

(71) Applicant: Beijing Zitiao Network Technology Co., Ltd., Beijing (CN)

(72) Inventor: Chen Han, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/294,433

(22) PCT Filed: Oct. 17, 2022

(86) PCT No.: PCT/CN2022/125570
§ 371 (c)(1),
(2) Date: Feb. 1, 2024

(87) PCT Pub. No.: WO2023/116145
PCT Pub. Date: Jun. 29, 2023

(65) Prior Publication Data
US 2024/0346848 A1    Oct. 17, 2024

(30) Foreign Application Priority Data

Dec. 21, 2021   (CN) .......................... 202111572188.3

(51) Int. Cl.
*G06V 40/16*     (2022.01)
*G06F 3/01*      (2006.01)
(Continued)

(52) U.S. Cl.
CPC ............ *G06V 40/174* (2022.01); *G06F 3/011* (2013.01); *G06T 13/40* (2013.01); *G06V 40/18* (2022.01)

(58) Field of Classification Search
CPC ...... G06V 40/174; G06V 40/18; G06V 10/75; G06V 10/764; G06V 10/82; G06V 40/16;
(Continued)

(56) References Cited

U.S. PATENT DOCUMENTS

| 11,328,533 B1 * | 5/2022 | Tadi ........................ G06N 20/00 |
| 2011/0007174 A1 * | 1/2011 | Bacivarov ................. G06T 7/40 |
| | | 348/222.1 |

(Continued)

FOREIGN PATENT DOCUMENTS

| CN | 105797375 A | 7/2016 |
| CN | 105868694 A | 8/2016 |

(Continued)

OTHER PUBLICATIONS

International Search Report in PCT/CN2022/125570, mailed Dec. 13, 2022, 6 pages.

(Continued)

*Primary Examiner* — Fernando Alcon
(74) *Attorney, Agent, or Firm* — Astute IP Law Group

(57) ABSTRACT

A method for determining an expression model, an electronic device and a non-transient computer readable storage medium are provided. The method includes: acquiring a facial image and eyeball feature information of a user; determining a corresponding expression classification according to the facial image; determining a corresponding expression model to be adjusted based on the expression classification; adjusting corresponding parameters of the expression model to be adjusted by utilizing the facial image and the eyeball feature information to obtain a target expression model.

15 Claims, 3 Drawing Sheets

(51) Int. Cl.
*G06T 13/40* (2011.01)
*G06V 40/18* (2022.01)

(58) Field of Classification Search
CPC ......... G06V 40/171; G06F 3/011; G06F 3/01; G06F 18/00; G06F 3/013; G06F 2203/012; G06T 13/40
See application file for complete search history.

(56) References Cited

U.S. PATENT DOCUMENTS

| | | | | |
|---|---|---|---|---|
| 2014/0307926 | A1* | 10/2014 | Murakami | G06V 40/174 382/107 |
| 2020/0272806 | A1* | 8/2020 | Walker | G06V 40/167 |
| 2021/0049350 | A1 | 2/2021 | Wu et al. | |
| 2022/0114838 | A1* | 4/2022 | Xu | G06V 10/761 |
| 2022/0237892 | A1* | 7/2022 | Anderton-Yang | G06V 10/764 |
| 2022/0269879 | A1* | 8/2022 | Liu | G06V 10/82 |
| 2025/0014386 | A1* | 1/2025 | Yan | G06V 40/172 |
| 2025/0218281 | A1* | 7/2025 | Lan | G06T 7/74 |
| 2025/0252775 | A1* | 8/2025 | Covell | G06V 10/764 |

FOREIGN PATENT DOCUMENTS

| | | |
|---|---|---|
| CN | 106599811 A | 4/2017 |
| CN | 106919259 A | 7/2017 |
| CN | 108537881 A | 9/2018 |
| CN | 110096925 A | 8/2019 |
| CN | 110442237 A | 11/2019 |
| CN | 110807364 A | 2/2020 |
| CN | 111632374 A | 9/2020 |
| CN | 112785669 A | 5/2021 |

OTHER PUBLICATIONS

Office Action for Chinese Patent Application No. 202111572188.3, mailed on Sep. 16, 2025, 12 pages.

* cited by examiner

Expression Classification: Happiness

Female, Long Hair    Male, Crop    Female, Bob

METHOD FOR DETERMINING EXPRESSION MODEL, ELECTRONIC DEVICE AND NON-TRANSIENT COMPUTER READABLE STORAGE MEDIUM

CROSS-REFERENCE TO RELATED APPLICATION

This is a national stage application based on International Patent Application No. PCT/CN2022/125570, filed Oct. 17, 2022, which claims priority to Chinese patent application No. 202111572188.3, titled "METHOD, APPARATUS, DEVICE AND COMPUTER-READABLE STORAGE MEDIUM FOR DETERMINE EXPRESSION MODEL" filed on Dec. 21, 2021, the disclosures of which are incorporated herein by reference in their entireties.

TECHNICAL FIELD

The present application belongs to the technical field of virtual reality, and particularly to a method, apparatus, device and computer-readable storage medium for determining an expression model.

BACKGROUND

In related art, a VR device can simulate a virtual world based on operations on data, providing users with simulation of senses such as vision, hearing, touch, etc. In a VR virtual scenario, the rendering of character avatar is generally based on a static model. Although a function for a user to set his/her own avatar can be supported, generally the set avatar is a fixed one and cannot be changed in the scenario. Even if the rendering of a dynamic avatar is involved in the scenario, it needs to rely on preset actions and expressions, and can only be displayed in certain plots in the scenario, or rely on displaying triggered by the user using buttons, resulting in bad user experience.

SUMMARY

The embodiments of the present application provide an implementation scheme different from the prior art, so as to solve the technical problem of the bad user experience due to the avatar determining method in the prior art.

In a first aspect, the embodiments of the present application provides a method for determining an expression model, comprising:
  acquiring a facial image and eyeball feature information of a user;
  determining a corresponding expression classification according to the facial image;
  determining a corresponding expression model to be adjusted based on the expression classification;
  adjusting corresponding parameters of the expression model to be adjusted by utilizing the facial image and the eyeball feature information, to obtain a target expression model.

In a second aspect, the embodiments of the present application provides a data processing method, comprising:
  collecting a facial image of a user and determining eyeball feature information of the user;
  transmitting the facial image and the eyeball feature information to a data processing device for the data processing device to determine a corresponding expression classification according to the facial image; determining a corresponding expression model to be adjusted based on the expression classification; adjusting corresponding parameters of the expression model to be adjusted by utilizing the facial image and the eyeball feature information, to obtain a target expression model.

In a third aspect, the embodiments of the present application provides an expression model determining apparatus, comprising:
  an acquisition module, for acquiring a facial image and eyeball feature information of a user;
  a first determination module, for determining a corresponding expression classification according to the facial image;
  a second determination module, for determining a corresponding expression model to be adjusted based on the expression classification;
  an adjustment module, for adjusting corresponding parameters of the expression model to be adjusted by utilizing the facial image and the eyeball feature information, to obtain a target expression model.

In a fourth aspect, the embodiments of the present application provides an electronic device, comprising:
  a processor; and
  a memory for storing executable instructions of the processor;
  wherein the processor is configured to perform the method of any of the first aspect, the second aspect, various implementations of the first aspect or various implementations of the second aspect, by executing the executable instructions.

In a fifth aspect, the embodiments of the present application provides a computer-readable storage medium having stored thereon computer programs which, when executed by a processor, implement the method of any of the first aspect, the second aspect, various implementations of the first aspect or various implementations of the second aspect, by executing the executable instructions.

In a sixth aspect, the embodiments of the present application provides a computer program product comprising computer programs which, when executed by a processor, implement the method of any of the first aspect, the second aspect, various implementations of the first aspect or various implementations of the second aspect, by executing the executable instructions.

The embodiments of the present application propose a scheme of: acquiring a facial image and eyeball feature information of a user; determining a corresponding expression classification according to the facial image; determining a corresponding expression model to be adjusted based on the expression classification; adjusting corresponding parameters of the expression model to be adjusted by utilizing the facial image and the eyeball feature information to obtain a target expression model. As such, a new 3D expression avatar can be synthesized in real time according to the acquired facial image and eyeball feature information of the user, and the 3D expression model can be dynamically and locally updated to generate a new avatar, which improves the realism of the avatar and improves the user experience.

BRIEF DESCRIPTION OF DRAWINGS

In order to illustrate the technical scheme in the embodiments of the present application or the prior art more clearly, the accompanying drawings needed to be used in the description of the embodiments or the prior art will be briefly introduced below. It is apparent to those ordinary skilled in the art that, the drawings in the following description are some embodiments of the present application, and other drawings can be obtained according to these drawings without creative work. In the accompanying drawings.

DETAILED DESCRIPTION

Hereinafter, the embodiments of the present application will be described in detail, examples of which are shown in the accompanying drawings. The embodiments described below with reference to the accompanying drawings are illustrative and are intended to explain the present application, but not to be construed as limitations of the present application.

The terms such as "first" and "second" in the specification, claims and drawings of the embodiments of the present application are used to distinguish similar objects, and are not necessarily used to describe a specific order or sequence. It should be understood that the data used in this way can be interchangeable when appropriate, so that the embodiments of the present application described herein can be implemented in other orders than those illustrated or described herein, for example. Furthermore, the terms such as "include" and "have" and any variations thereof are intended to cover non-exclusive inclusion, for example, processes, methods, systems, products or devices that includes a series of steps or units is not necessarily limited to those explicitly listed steps or units, but may include other steps or units that are not explicitly listed or inherent to these processes, methods, products or devices.

First of all, a part of the terms in the embodiments of the present application are explained and illustrated below, so as to facilitate the understanding of those skilled in the art.

VR: Virtual Reality technology, which is a brand-new practical technology developed in the 20th century. The virtual reality technology embraces computer, electronic information and simulation technology, whose basic implementation is computer-simulated virtual environment so as to give people a sense of environmental immersion.

The technical schemes of the present application and how the technical schemes of the present application solves the above technical problem will be described in detail with specific embodiments. The following several specific embodiments can be combined with each other, and the same or similar concepts or processes may not be detailed in certain embodiments. The embodiments of the present application will be described below with reference to the accompanying drawings.

Figure 1:
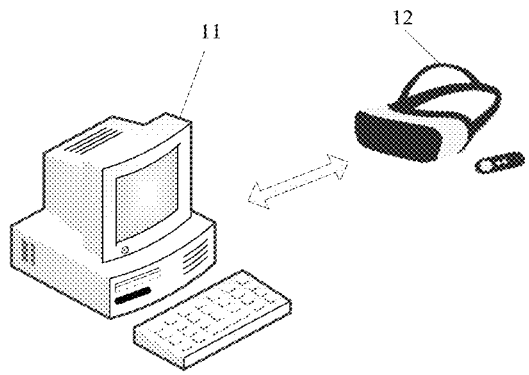
FIG. 1 is a schematic structural diagram of an expression model determining system provided by an embodiment of the present application.

FIG. 1 is a schematic structural diagram of an expression model determining system provided by an exemplary embodiment of the present application. This structure comprises a data processing device 11 and a head-mounted device 12, the head-mounted device 12 is used for: collecting a facial image of a user and determining eyeball feature information of the user; transmitting the facial image and the eyeball feature information to the data processing device 11;

The data processing device 11 receives the facial image of the user and the eyeball feature information of the user; determines a corresponding expression classification according to the facial image; determines a corresponding expression model to be adjusted based on the expression classification; adjusts corresponding parameters of the expression model to be adjusted by utilizing the facial image and the eyeball feature information to obtain a target expression model.

In some embodiments, the afore-mentioned data processing device 11 may be a PC, a mobile terminal device or the like.

In some embodiments, the afore-mentioned data processing device 11 may also be a server device. When the data processing device 11 is a server device, the head-mounted device 12 may transmit the facial image and the eyeball feature information to the server device through a PC or a mobile terminal device.

Further, after determining the target expression model, the data processing device 11 will synthesize scenario picture data to be displayed according to scenario data of a scenario corresponding to the target expression model, and transmit the scenario picture data to be displayed to the head-mounted device 13 for display. The head-mounted device 13 and the head-mounted device 12 may be a same device, or the head-mounted device 13 may be another device.

In other embodiments of the present application, after collecting the facial image of the user and determining the eyeball feature information of the user, the afore-mentioned head-mounted device 12 may determine a corresponding expression classification according to the facial image; determine a corresponding expression model to be adjusted according to the expression classification; adjust corresponding parameters of the expression model to be adjusted by utilizing the facial image and the eyeball feature information to obtain a target expression model, and push the target expression model to the server device through the afore-mentioned data processing device 11, so that the server device may synthesize scenario picture data to be displayed according to the target expression model and the data of a scenario where the target expression model is located, and transmit the scenario picture data to be displayed to the head-mounted device 13 for display. The head-mounted device 13 and the head-mounted device 12 may be a same device, or the head-mounted device 13 may be another device.

Through the afore-mentioned scheme, the avatar of the user rendered in the scenario can be updated in real time, which improves the authenticity of the VR scenario and the user experience.

The execution principle and interaction process of the specific functions in various constituent units in this system embodiment, such as the data processing device 11 and the head-mounted device 12, can be referred to in the description of the following various method embodiments.

Figure 2A:
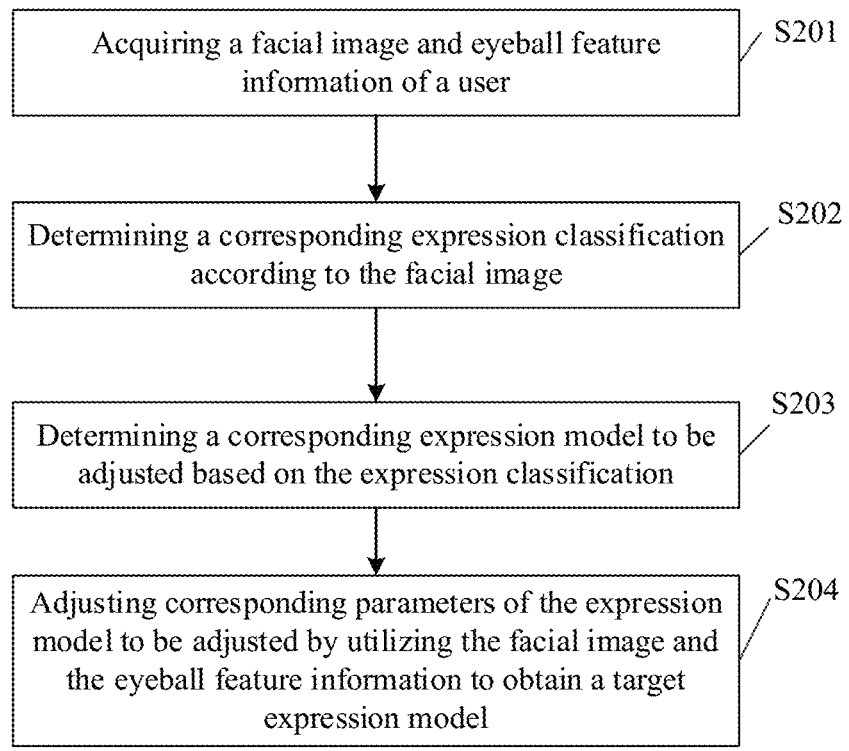
FIG. 2a is a schematic flowchart diagram of an expression model determining method provided by an embodiment of the present application.

FIG. 2a is a schematic flowchart of an expression model determining method provided by an exemplary embodiment of the present application, which is applicable to the afore-mentioned data processing device, server device or head-mounted device, and at least comprises the following steps:

S201: acquiring a facial image and eyeball feature information of a user;

S202: determining a corresponding expression classification according to the facial image;

S203: determining a corresponding expression model to be adjusted based on the expression classification;

S204: adjusting corresponding parameters of the expression model to be adjusted by utilizing the facial image and the eyeball feature information to obtain a target expression model.

Specifically, the afore-mentioned facial image may be collected by photographing apparatuses disposed on the head-mounted device. Specifically, the mounting positions of the photographing apparatuses and the number of the photographing apparatuses are not limited by the present application.

Further, the afore-mentioned eyeball feature information includes eyeball position information and/or line-of-sight direction, etc., the eyeball position information may be information of a distance between the center of an eyeball and the central coordinate of the eye where the eyeball is located, or information of a ratio of the distance between the center of an eyeball and the central coordinate of the eye where the eyeball is located to the width of the eye (i.e., a spacing between the inner corner and the outer corner of a same eye).

Figure 2B:
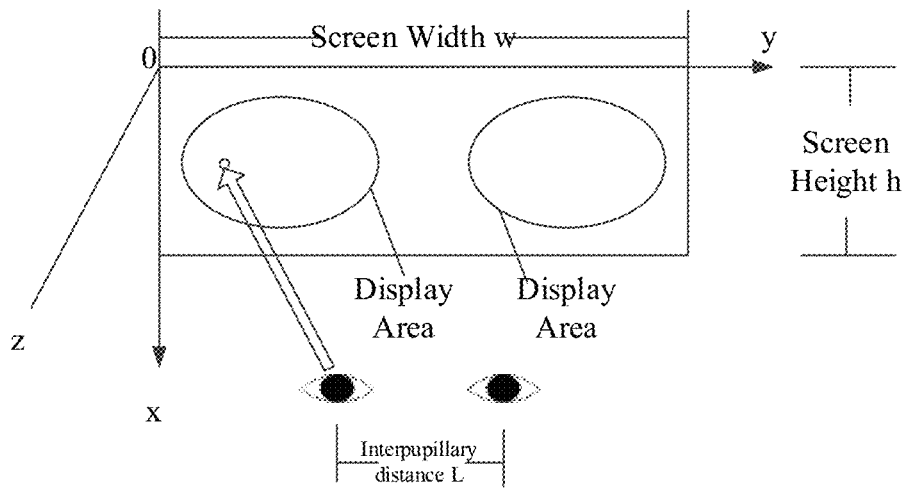
FIG. 2b is a schematic diagram of a geometric model provided by an embodiment of the present application.

Specifically, when the eyeball position information is the information of a distance between the center of an eyeball and the central coordinate of the eye where the eyeball is located, the determination of the eyeball position information may be carried out based on a geometric model shown in FIG. 2b. Specifically, the geometric model may be constructed according to the real-time positions of the eyeball and the VR head-mounted device, and an intersection of the line of sight and the screen in the VR head-mounted device, i.e., a position at which the eyeball is gazing on the screen, may be calculated; further, the eyeball position information is determined according to the gazed position.

Specifically, the head-mounted device may be provided with a display screen. Specifically, it may include only one display screen for displaying a picture for being viewed by both eyes, or it may include two display screens for respectively displaying pictures for being viewed by the left eye and the right eye.

In some embodiments of the present application, as shown in FIG. 2b, if the head-mounted device is provided with one display screen containing two display areas, then they may respectively display pictures for being viewed by the left eye and the right eye. Taking a display area corresponding to either of the eyes as an example, for example, taking the display area corresponding to the left eye as an example, the upper left corner of the screen may be the origin 0, the plane where the screen is located may be xoy, and it is known that the distance between the eyeball and the screen is d, the interpupillary distance is L, the screen height is H, the screen width is w, then the coordinate R1 of the left eye is (h/2, w/2-L/2, d). If an eye tracking vector passing through the point of R1 is determined as RA (a, b, c) according to an eye tracking module, the intersection of the vector RA passing through R1 and the xoy plane, i.e., the coordinate of the gaze point on the screen, can be calculated. Specifically, the determination of the coordinate of the intersection of the vector RA passing through R1 and the xoy plane can be carried out according to the following formula:

$$S=R1+(RN*(R0-R1))/(RN*RA)*RA$$

where R1 is the coordinate of the left eye, RA is the direction vector of the line of sight, RN is the normal vector of the xoy plane, R0 is a point on the xoy plane; and S is the calculated coordinate of the intersection. R1, RA, RN and R0 are known information, which can be directly acquired from the eye tracking module or determined according to the prior art, which will not be detailed here.

Further, after determining the coordinate of the intersection of the vector RA passing R1 and the xoy plane, information of a first distance between the coordinate of the center of the display area corresponding to the left eye and the coordinate of the intersection can be further determined according to the coordinate of the center and the coordinate of the intersection; acquiring eye width information of the left eye; and according to the information of the first distance, the information of the area width of the display area corresponding to the left eye, and the information of the eye width, information of a second distance between the center of the eyeball and the center of the left eye is determined.

Specifically, determining, according to the information of the first distance and the information of the area width of the display area corresponding to the left eye, and the information of the eye width, the information of the second distance between the center of the eyeball and the center of the left eye, comprises:

determining a proportional value of the information of the area width of the display area and the information of the eye width;

taking a ratio of the information of the first distance to the proportional value as the information of the second distance.

Further, the information of the eyeball position corresponding to the left eye is the information of the second distance, and accordingly, the determination of the information of the eyeball position corresponding to the right eye is similar to that of the information of the eyeball position corresponding to the left eye, which will not be detailed here.

It should be noted that the information of the area width of the afore-mentioned display area may be determined according to the known screen parameter information of the display screen.

Further, in afore-mentioned step S202, determining a corresponding expression classification according to the facial image comprises:

inputting the facial image into a preset expression recognition model to determine the expression classification, the expression recognition model may be a machine learning model determined based on the training of a plurality of groups of sample data, and specifically may be a neural network model.

Specifically, the afore-mentioned expression recognition model may recognize multiple facial expressions, such as: anger, happiness, surprise, sadness, etc. The afore-mentioned expression classification determined after inputting the facial image into the preset expression recognition model may be any of the afore-mentioned multiple facial expressions.

Further, in the afore-mentioned step S203, determining a corresponding expression model to be adjusted based on the expression classification may specifically comprise: determining the expression model to be adjusted according to the expression classification and a preset correspondence.

Further, the afore-mentioned preset correspondence is a correspondence between expression classifications and expression models corresponding thereto. Specifically, the correspondence between the expression classifications and the expression models corresponding thereto may be one-to-one or one-to-multiple correspondence.

In some embodiments, when the correspondence between the expression classifications and the expression models corresponding thereto is one-to-one correspondence, an expression model corresponding to an expression classification determined according to the preset correspondence may be directly taken as the expression model to be adjusted;

When the correspondence between the expression classifications and the expression models corresponding thereto is one-to-multiple correspondence, determining a corresponding expression model to be adjusted based on the expression classification, that is, determining the expression model to be adjusted according to the expression classification and the preset correspondence may specifically comprise:

determining a plurality of corresponding selectable expression models by utilizing the expression classification;

controlling to render the plurality of selectable expression models;

acquiring a selecting instruction of the user for selecting the expression model to be adjusted from the plurality of selectable expression models;

determining the expression model to be adjusted based on the selecting instruction.

Figure 2C:
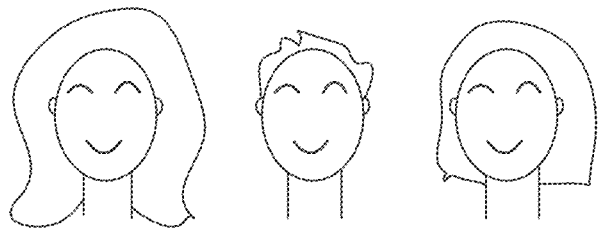
FIG. 2c is a schematic diagram of a plurality of selectable expression models provided by an embodiment of the present application.

Specifically, the afore-mentioned plurality of selectable expression models may be determined according to a library containing a preset correspondence between the expression classifications and a plurality of selectable expression models corresponding thereto. Among the plurality of selectable expression models, the model features corresponding to different selectable expression models may be different. The model features may include any one or more of: gender, hairstyle, clothing and accessories, as shown in FIG. 2c, for example. Additionally, the model features may further include other information to further improve the personalized experience of the user.

In other embodiments of the present application, determining the plurality of selectable expression models corresponding to the expression classifications by utilizing the expression classifications further comprises:

determining facial proportion information according to the facial image;

determining the plurality of selectable expression models according to the facial proportion information and an expression model library corresponding to the expression classifications.

Specifically, the afore-mentioned facial proportion information includes facial width proportion information and facial length proportion information. In some embodiments, the facial length proportion information includes any one or more of: a proportion of the upper part of the face to the length of the face, a proportion of the middle part of the face to the length of the face, and a proportion of lower part of the face to the length of the face; whereas the facial width proportion information includes one or more of: a proportion of a distance from the outer side of the left eye to the left hairline to the width of the face, a proportion of the length of the left eye to the width of the face, a proportion of a distance between the inner corner of the left eye and the inner corner of the right eye to the width of the face, a proportion of the length of the right eye to the width of the face, and a proportion of a distance from the outer side of the right eye to the right hairline to the width of the face.

Further, the model facial proportion information corresponding to each of the afore-mentioned plurality of selectable expression models determined according to the facial proportion information and the expression model library corresponding to the expression classifications is completely consistent with or partially consistent with the facial proportion information corresponding to the facial image. Accordingly, the model facial proportion information includes corresponding model facial width proportion information and model facial length proportion information. In some embodiments, the model facial length proportion information includes any one or more of: a proportion of the upper part of the model face to the length of the model face, a proportion of the middle part of the model face to the length of the model face, and a proportion of the lower part of the model face to the length of the model face; whereas the model facial width proportion information includes one or more of: a proportion of a distance from the outer side of the left eye to the left hairline in the model to the width of the model face, a proportion of the length of left eye in the model to the width of the model face, a proportion of a distance between the inner corner of the left eye and the inner corner of the right eye in the model to the width of the model face, a proportion of the length of the right eye in the model to the width of the model face, and a proportion of a distance from the outer side of the right eye to the right hairline in the model to the width of the model face.

In some embodiments, the expression model involved in the present application may be a 2D model or a 3D model.

Further, in the afore-mentioned step S204, adjusting corresponding parameters of the expression model to be adjusted by utilizing the facial image and the eyeball feature information to obtain the target expression model comprises:

S2041: determining corresponding facial feature information according to the facial image, the facial feature information includes any one or more of: information of a distance between angulus orises at two sides, and information of a vertical distance between an angulus oris at one side or angulus orises at two sides and a labial peak;

S2042: adjusting the corresponding parameters of the expression model to be adjusted by utilizing the facial feature information and the eyeball feature information to obtain the target expression model.

In some embodiments, in the afore-mentioned S2041, the determination of the corresponding facial feature information according to the facial image may be implemented based on image recognition technologies, or the facial image may be input into a feature recognition model obtained by training to determine the facial feature information, which is not limited by the present application.

Further, in addition to the afore-mentioned information of the distance between the angulus orises at two sides, and information of the vertical distance between the angulus oris at one side or angulus orises at two sides and the labial peak, the facial feature information may further contain information of feature points of the lip, the information of the feature points of the lip may be the coordinates of the feature points of the lip. Specifically, the feature points of the lip may include the points of the angulus orises at two sides, the two labial peaks, the lowest point of the lip and the like. The coordinates of the feature points of the lip may be determined according to the facial image through the related neural network model.

In some embodiments, the facial image of the user may be a 2D image or a 3D image.

Further, in the afore-mentioned step S2042, adjusting the corresponding parameters of the expression model to be adjusted by utilizing the facial feature information and the eyeball feature information to obtain the target expression model comprises:

adjusting facial feature parameters to be adjusted of the expression model to be adjusted to match with the facial feature information, and adjusting eyeball feature parameters of the expression model to be adjusted to match with the eyeball feature information, to obtain the target expression model.

Specifically, the parameter types of the facial feature parameters to be adjusted are the same as those of the facial feature information. For example, when the facial feature information is the information of the distance between the angulus orises at two sides, the facial feature parameters to be adjusted are also the information of the distance between the angulus orises at two sides. Accordingly, the parameter types of the eyeball feature parameters of the expression model to be adjusted are the same as those of the eyeball feature information. For example, when the eyeball feature information is the eyeball position information, the eyeball feature parameters of the expression model to be adjusted are also the eyeball position information.

Adjusting facial feature parameters to be adjusted of the expression model to be adjusted to match with the facial feature information means adjusting the facial feature parameters to be adjusted of the expression model to be adjusted to be the same as the facial feature information; and adjusting eyeball feature parameters of the expression model to be adjusted to match with the eyeball feature information means adjusting the eyeball feature parameters of the expression model to be adjusted to be the same as the eyeball feature information.

Further, when adjusting the corresponding parameters of the expression model to be adjusted according to the facial feature information and the eyeball feature information, the present application may further adjust other facial information in the expression model to be adjusted jointly with the corresponding parameters of the facial feature information and the eyeball feature information, to make the model smoother.

Additionally, continuous execution of the afore-mentioned steps S201 to S204 can realize continuous update of the target expression model, and in turn reflect the user's eye movement information and expression changes to the 3D avatar model in the VR scenario in real time, so that the 3D avatar in the virtual reality is more vivid and lifelike, and the VR user can feel the real actions and expressions of the other party in the virtual world.

The embodiments of the present application propose a scheme of: acquiring a facial image and eyeball feature information of a user; determining a corresponding expression classification according to the facial image; determining a corresponding expression model to be adjusted based on the expression classification; adjusting corresponding parameters of the expression model to be adjusted by utilizing the facial image and the eyeball feature information to obtain a target expression model. As such, a new 3D expression avatar can be synthesized in real time according to the acquired facial image and eyeball feature information of the user, and the 3D expression model can be dynamically and locally updated to generate a new avatar, which improves the realism of the avatar and improves the user experience.

Further, the present application further provides a data processing method, which is applicable to a head-mounted device. Specifically, the method may comprise the following steps:

collecting a facial image of a user and determining eyeball feature information of the user;

transmitting the facial image and the eyeball feature information to a data processing device for the data processing device to determine a corresponding expression classification according to the facial image; determining a corresponding expression model to be adjusted based on the expression classification; adjusting corresponding parameters of the expression model to be adjusted by utilizing the facial image and the eyeball feature information to obtain a target expression model.

The corresponding specific implementation of this embodiment can be referred to in the afore-mentioned contents, which will not be detailed here.

Further, the present application further provides a data processing apparatus. The apparatus may specifically comprise an acquisition module, a calling module, and a synthesis and generation module, wherein:

the acquisition module is used for eye tracking, expression recognition and facial feature information acquisition;

the calling module is used for determining a position of an eyeball according to a result of the eyeball tracking, and determining an expression classification according to a result of the expression recognition;

the synthesis module is used for synthesizing a new avatar according to the position of the eyeball, the facial feature information and the 2D or 3D model corresponding to the expression classification.

The corresponding specific implementation of this embodiment can be referred to in the afore-mentioned contents, which will not be detailed here.

Figure 3:
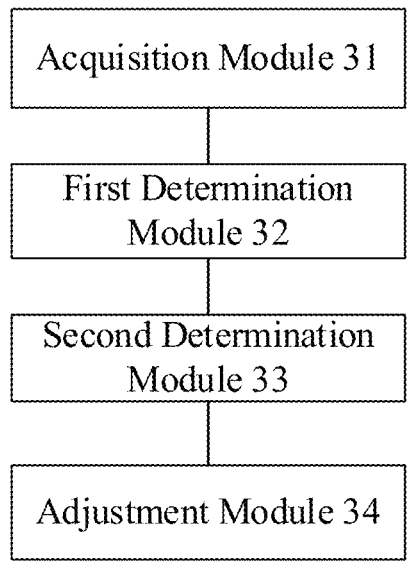
FIG. 3 is a schematic structural diagram of an expression model determining apparatus provided by an embodiment of the present application.

FIG. 3 is a schematic structural diagram of an expression model determining apparatus provided by an exemplary embodiment of the present application. The apparatus comprises an acquisition module 31, a first determination module 32, a second determination module 33 and an adjustment module 34, wherein:

the acquisition module 31 is used for acquiring a facial image and eyeball feature information of a user;

the first determination module 32 is used for determining a corresponding expression classification according to the facial image;

the second determination module 33 is used for determining a corresponding expression model to be adjusted based on the expression classification;

the adjustment module 34 is used for adjusting corresponding parameters of the expression model to be adjusted by utilizing the facial image and the eyeball feature information to obtain a target expression model.

In some embodiments, in determining the corresponding expression classification according to the facial image, the afore-mentioned apparatus is specifically used for:

inputting the facial image into a preset expression recognition model to determine the expression classification, wherein the expression recognition model is a neural network model.

In some embodiments, in adjusting corresponding parameters of the expression model to be adjusted by utilizing the facial image and the eyeball feature information to obtain a target expression model, the afore-mentioned apparatus is specifically used for:

determining corresponding facial feature information according to the facial image, wherein the facial feature information includes any one or more of: information of a distance between angulus orises at two sides, and information of a vertical distance between an angulus oris at one side or angulus orises at two sides and a labial peak;

adjusting the corresponding parameters of the expression model to be adjusted by utilizing the facial feature information and the eyeball feature information to obtain the target expression model.

In some embodiments, in adjusting the corresponding parameters of the expression model to be adjusted by utilizing the facial feature information and the eyeball feature information to obtain the target expression model, the afore-mentioned apparatus is specifically used for:

adjusting facial feature parameters to be adjusted of the expression model to be adjusted to match with the facial feature information, and adjusting eyeball feature parameters of the expression model to be adjusted to match with the eyeball feature information, to obtain the target expression model.

In some embodiments, in determining the corresponding expression model to be adjusted based on the expression classification, the afore-mentioned apparatus is specifically used for:

determining a plurality of corresponding selectable expression models by utilizing the expression classification;

controlling to render the plurality of selectable expression models;

acquiring a selecting instruction of the user for selecting the expression model to be adjusted from the plurality of selectable expression models;

determining the expression model to be adjusted based on the selecting instruction.

In some embodiments, in determining the plurality of corresponding selectable expression models by utilizing the expression classification, the afore-mentioned apparatus is specifically used for:

determining corresponding facial proportion information according to the facial image;

determining the plurality of selectable expression models according to the facial proportion information and an expression model library corresponding to the expression classification.

An exemplary embodiment of the present application further provides a data processing apparatus including an acquisition module and a transmitting module, wherein:

the acquisition module is used for collecting a facial image of a user and determining eyeball feature information of the user;

the transmitting module is used for transmitting the facial image and the eyeball feature information to a data processing device for the data processing device to determine a corresponding expression classification according to the facial image; determining a corresponding expression model to be adjusted based on the expression classification; adjusting corresponding parameters of the expression model to be adjusted by utilizing the facial image and the eyeball feature information to obtain a target expression model.

It should be understood that the apparatus embodiments and the method embodiments can correspond to each other, and similar descriptions can be referred to in the method embodiment, which will not be detailed here in order to avoid repetition. Specifically, the apparatus can execute the above-mentioned method embodiment, and the afore-mentioned and other operations and/or functions of the respective modules in the apparatus are respectively for the corresponding flows in the respective methods in the above-mentioned method embodiment, which will not be detailed here for brevity.

In the above content, the apparatus of the embodiments of the present application is described from the perspective of functional modules in conjunction with the accompanying drawings. It should be understood that the functional modules can be implemented by means of hardware, by means of instructions in software, and by means of a combination of hardware and software modules. Specifically, the various steps of the method embodiments in the embodiment of the present application can be accomplished by an integrated logic circuit of hardware and/or instructions in software in the processor, and the steps of the method disclosed in conjunction with the embodiments of the present application can be directly embodied as being executed and accomplished by a hardware decoding processor, or being executed and accomplished by a combination of hardware and software modules in the decoding processor. In some embodiments, the software modules can be located in a mature storage media in the art, such as a random access memory, flash memory, read-only memory, programmable read-only memory, electrically erasable programmable memory, register, etc. The storage medium is located in the memory, and the processor reads the information in the memory and performs the steps in the above method embodiments in conjunction with the hardware thereof.

Figure 4:
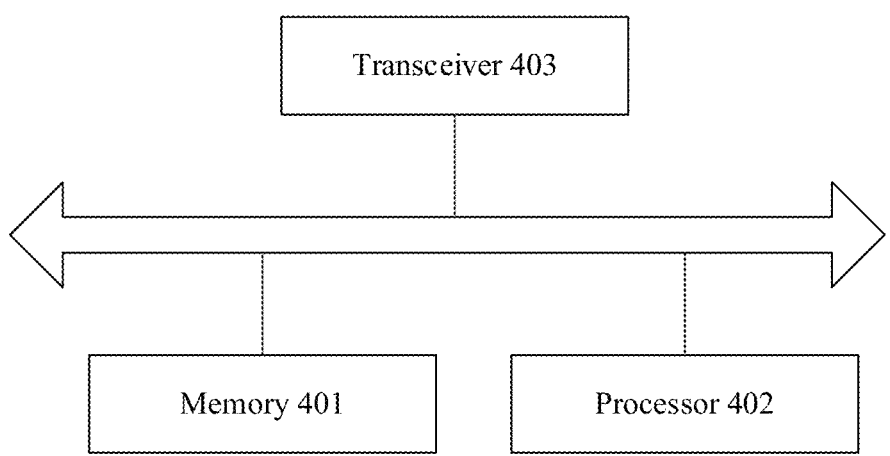
FIG. 4 is a schematic structural diagram of an electronic device provided by an embodiment of the present application.

FIG. 4 is a schematic block diagram of an electronic device provided by an embodiment of the present application. The electronic device may comprise:

a memory 401 and a processor 402, the memory 401 is used for storing computer programs and transmitting codes of the programs to the processor 402. In other words, the processor 402 may call and execute computer programs from the memory 401 to implement the methods in the embodiments of the present application.

For example, the processor 402 may be used to perform the above method embodiments according to instructions in the computer programs.

In some embodiments of the present application, the processor 402 may include, but is not limited to:

a General Processor, Digital Signal Processor (DSP), Application Specific Integrated Circuit (ASIC), Field Programmable Gate Array (FPGA) or other programmable logic device, discrete gate or transistor logic device, discrete hardware component, etc.

In some embodiments of the present application, the memory 401 includes, but is not limited to:

a volatile memory and/or nonvolatile memory. The nonvolatile memory may be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of illustration rather than limitation, RAM of many forms are available, such as a Static RAM (SRAM), Dynamic RAM (DRAM), synchronous DRAM (SDRAM), Double Data Rate SDRAM (DDR SDRAM), Enhanced SDRAM (ESDRAM), Synchronous Link DRAM (SLDRAM) and Direct Rambus RAM (DR RAM).

In some embodiments of the present application, the computer program may be divided into one or more modules which are stored in the memory 401 and executed by the processor 402 to accomplish the method provided by the present application. The one or more modules may be a series of instruction segments of the computer programs capable of accomplishing specific functions, the instruction segments are used for describing the execution process of the computer programs in the electronic device.

As shown in FIG. 4, the electronic device may further comprise:
- a transceiver 403, which may be connected to the processor 402 or the memory 401.

The processor 402 may control the transceiver 403 to communicate with other devices. Specifically, it can transmit information or data to other devices or receive information or data transmitted by other devices. The transceiver 403 may include a transmitter and a receiver. The transceiver 403 may further include antennas, and the number of the antennas may be one or more.

It should be understood that the various components in the electronic device are connected through a bus system. In addition to a data bus, the bus system includes a power bus, a control bus and a status signal bus.

The present application further provides a computer storage medium having stored thereon a computer program which, when executed by a computer, causes the computer to perform the methods of the above method embodiments. In other words, the embodiments of the present application further provide a computer program product containing instructions which, when executed by a computer, cause the computer to execute the method of the above method embodiments.

When implemented in software, it can be fully or partially implemented in the form of a computer program product. The computer program product includes one or more computer instructions. When the computer program instructions are loaded and executed on a computer, the flows or functions according to the embodiments of the present application are generated in a whole or in part. The computer can be a general-purpose computer, a special-purpose computer, a computer network, or other programmable apparatus. The computer instructions can be stored in a computer-readable storage medium or transmitted from one computer-readable storage medium to another. For example, the computer instructions can be transmitted from a website, computer, server or data center to another website, computer, server or data center by wire (such as coaxial cable, optical fiber, digital subscriber line (DSL)) or wirelessly (such as infrared, radio, microwave, etc.). The computer-readable storage medium can be any available medium that a computer can access or a data storage device such as a server or a data center that contains one or more available media. The available medium can be a magnetic medium (e.g., floppy disk, hard disk, magnetic tape), an optical medium (e.g., digital video disc (DVD)), or a semiconductor medium (e.g., solid state disk (SSD)) and the like.

According to one or more embodiments of the present application, there is provided a method for determining an expression model, comprising:
- acquiring a facial image and eyeball feature information of a user;
- determining a corresponding expression classification according to the facial image;
- determining a corresponding expression model to be adjusted based on the expression classification;
- adjusting corresponding parameters of the expression model to be adjusted by utilizing the facial image and the eyeball feature information to obtain a target expression model.

According to one or more embodiments of the present application, the determining the corresponding expression classification according to the facial image comprises:
- inputting the facial image into a preset expression recognition model to determine the expression classification, wherein the expression recognition model is a neural network model.

According to one or more embodiments of the present application, the adjusting corresponding parameters of the expression model to be adjusted by utilizing the facial image and the eyeball feature information to obtain a target expression model comprises:
- determining corresponding facial feature information according to the facial image, wherein the facial feature information includes any one or more of: information of a distance between angulus orises at two sides, and information of a vertical distance between an angulus oris at one side or angulus orises at two sides and a labial peak;
- adjusting the corresponding parameters of the expression model to be adjusted by utilizing the facial feature information and the eyeball feature information to obtain the target expression model.

According to one or more embodiments of the present application, the adjusting the corresponding parameters of the expression model to be adjusted by utilizing the facial feature information and the eyeball feature information to obtain the target expression model comprises:
- adjusting facial feature parameters to be adjusted of the expression model to be adjusted to match with the facial feature information, and adjusting eyeball feature parameters of the expression model to be adjusted to match with the eyeball feature information, to obtain the target expression model.

According to one or more embodiments of the present application, the determining the corresponding expression model to be adjusted based on the expression classification comprises:
- determining a plurality of corresponding selectable expression models by utilizing the expression classification;
- controlling to render the plurality of selectable expression models;
- acquiring a selecting instruction of the user for selecting the expression model to be adjusted from the plurality of selectable expression models;
- determining the expression model to be adjusted based on the selecting instruction.

According to one or more embodiments of the present application, the determining the plurality of corresponding selectable expression models by utilizing the expression classification comprises:
- determining corresponding facial proportion information according to the facial image;
- determining the plurality of selectable expression models according to the facial proportion information and an expression model library corresponding to the expression classification.

According to one or more embodiments of the present application, there is provided a data processing method, comprising:
- collecting a facial image of a user and determining eyeball feature information of the user;
- transmitting the facial image and the eyeball feature information to a data processing device for the data processing device to determine a corresponding expression classification according to the facial image; determining a corresponding expression model to be adjusted based on the expression classification; adjusting corresponding parameters of the expression model to be adjusted by utilizing the facial image and the eyeball feature information to obtain a target expression model.

According to one or more embodiments of the present application, there is provided an expression model determining apparatus, comprising:

an acquisition module, for acquiring a facial image and eyeball feature information of a user;

a first determination module, for determining a corresponding expression classification according to the facial image;

a second determination module, for determining a corresponding expression model to be adjusted based on the expression classification;

an adjustment module, for adjusting corresponding parameters of the expression model to be adjusted by utilizing the facial image and the eyeball feature information to obtain a target expression model.

According to one or more embodiments of the present application, in determining the corresponding expression classification according to the facial image, the afore-mentioned apparatus is specifically used for:

inputting the facial image into a preset expression recognition model to determine the expression classification, wherein the expression recognition model is a neural network model.

According to one or more embodiments of the present application, in adjusting the corresponding parameters of the expression model to be adjusted by utilizing the facial image and the eyeball feature information to obtain a target expression model, the afore-mentioned apparatus is specifically used for:

determining corresponding facial feature information according to the facial image, wherein the facial feature information includes any one or more of: information of a distance between angulus orises at two sides, and information of a vertical distance between an angulus oris at one side or angulus orises at two sides and a labial peak;

adjusting the corresponding parameters of the expression model to be adjusted by utilizing the facial feature information and the eyeball feature information to obtain the target expression model.

According to one or more embodiments of the present application, in adjusting the corresponding parameters of the expression model to be adjusted by utilizing the facial feature information and the eyeball feature information to obtain the target expression model, the afore-mentioned apparatus is specifically used for:

adjusting facial feature parameters to be adjusted of the expression model to be adjusted to match with the facial feature information, and adjusting eyeball feature parameters of the expression model to be adjusted to match with the eyeball feature information, to obtain the target expression model.

According to one or more embodiments of the present application, in determining the corresponding expression model to be adjusted based on the expression classification, the afore-mentioned apparatus is specifically used for:

determining a plurality of corresponding selectable expression models by utilizing the expression classification;

controlling to render the plurality of selectable expression models;

acquiring a selecting instruction of the user for selecting the expression model to be adjusted from the plurality of selectable expression models;

determining the expression model to be adjusted based on the selecting instruction.

According to one or more embodiments of the present application, in determining the plurality of corresponding selectable expression models by utilizing the expression classification, the afore-mentioned apparatus is specifically used for:

determining corresponding facial proportion information according to the facial image;

determining the plurality of selectable expression models according to the facial proportion information and an expression model library corresponding to the expression classification.

According to one or more embodiments of the present application, there is provided a data processing apparatus including an acquisition module and a transmitting module, wherein:

the acquisition module is used for collecting a facial image of a user and determining eyeball feature information of the user;

the transmitting module is used for transmitting the facial image and the eyeball feature information to a data processing device for the data processing device to determine a corresponding expression classification according to the facial image; determining a corresponding expression model to be adjusted based on the expression classification; adjusting corresponding parameters of the expression model to be adjusted by utilizing the facial image and the eyeball feature information to obtain a target expression model.

According to one or more embodiments of the present application, there is provided an electronic device, comprising:

a processor; and a memory for storing executable instructions of the processor;

wherein the processor is configured to perform the respective method above by executing the executable instructions.

According to one or more embodiments of the present application, there is provided a computer-readable storage medium having stored thereon a computer program which, when executed by a processor, implements the respective method above.

Those ordinary skilled in the art can recognize that the modules and algorithm steps of the various examples described in conjunction with the embodiments disclosed herein can be implemented in electronic hardware, or a combination of computer software and electronic hardware. Whether these functions are implemented in hardware or software depends on the specific application and design constraints of the technical scheme. Skilled technicians can use different methods to implement the described functions for each specific application, but such implementation should not be considered beyond the scope of the present application.

In several embodiments provided by the present application, it should be understood that the disclosed systems, apparatuses and methods can implemented in other ways. For example, the apparatus embodiments described above are merely schematic. For example, the division of the module is merely a division of logical function. In actual implementation, there may be other way of dividing, such as multiple modules or components can be combined or integrated into another system, or some features can be ignored or not executed. On the other hand, the mutual coupling or direct coupling or communicative connection shown or discussed can be indirect coupling or communicative connection through some interfaces, apparatuses or modules, which can be electrical, mechanical or other forms.

The modules illustrated as separate components may or may not be physically separated, and the components shown as modules may or may not be physical modules, that is, they may be located in one place or distributed across multiple network units. Some or all of the modules can be selected according to actual needs to achieve the purpose of the scheme of this embodiment. For example, various functional modules in various embodiments of the present application can be integrated into one processing module, or various modules can exist physically and separately, or two or more modules can be integrated into one module.

The above is only the specific implementation of the present application, but the protection scope of the present application is not limited to this. The changes or substitutions that can be easily conceived of by any technician familiar with the art within the technical scope disclosed by the present application, should be encompassed in the protection scope of the present application. Therefore, the protection scope of the present application should be based on the protection scope of the claims.

The invention claimed is:

1. A method for determining an expression model, comprising:
   acquiring a facial image and eyeball feature information of a user;
   determining a corresponding expression classification according to the facial image;
   determining a corresponding expression model to be adjusted based on the expression classification;
   adjusting corresponding parameters of the expression model to be adjusted by utilizing the facial image and the eyeball feature information to obtain a target expression model,
   wherein adjusting the corresponding parameters of the expression model to be adjusted by utilizing the facial image and the eyeball feature information to obtain the target expression model comprises:
   determining corresponding facial feature information according to the facial image, wherein the facial feature information includes any one or more of: information of a distance between angulus orises at two sides, and information of a vertical distance between an angulus oris at one side or angulus orises at two sides and a labial peak;
   adjusting the corresponding parameters of the expression model to be adjusted by utilizing the facial feature information and the eyeball feature information to obtain the target expression model.

2. The method according to claim 1, wherein determining the corresponding expression classification according to the facial image comprises:
   inputting the facial image into a preset expression recognition model to determine the expression classification, wherein the expression recognition model is a neural network model.

3. The method according to claim 1, wherein adjusting the corresponding parameters of the expression model to be adjusted by utilizing the facial feature information and the eyeball feature information to obtain the target expression model comprises:
   adjusting facial feature parameters to be adjusted of the expression model to be adjusted to match with the facial feature information, and adjusting eyeball feature parameters of the expression model to be adjusted to match with the eyeball feature information, to obtain the target expression model.

4. The method according to claim 1, wherein determining the corresponding expression model to be adjusted based on the expression classification comprises:
   determining a plurality of corresponding selectable expression models by utilizing the expression classification;
   controlling to render the plurality of selectable expression models;
   acquiring a selecting instruction of the user for selecting the expression model to be adjusted from the plurality of selectable expression models;
   determining the expression model to be adjusted based on the selecting instruction.

5. The method according to claim 4, wherein determining the plurality of corresponding selectable expression models by utilizing the expression classification comprises:
   determining corresponding facial proportion information according to the facial image;
   determining the plurality of selectable expression models according to the facial proportion information and an expression model library corresponding to the expression classification.

6. An electronic device, comprising:
   at least one processor; and
   a memory for storing executable instructions for the at least one processor;
   wherein the at least one processor is configured to perform a method by executing the executable instructions, wherein the method comprises:
   acquiring a facial image and eyeball feature information of a user;
   determining a corresponding expression classification according to the facial image;
   determining a corresponding expression model to be adjusted based on the expression classification;
   adjusting corresponding parameters of the expression model to be adjusted by utilizing the facial image and the eyeball feature information to obtain a target expression model,
   wherein adjusting the corresponding parameters of the expression model to be adjusted by utilizing the facial image and the eyeball feature information to obtain the target expression model comprises:
   determining corresponding facial feature information according to the facial image, wherein the facial feature information includes any one or more of: information of a distance between angulus orises at two sides, and information of a vertical distance between an angulus oris at one side or angulus orises at two sides and a labial peak;
   adjusting the corresponding parameters of the expression model to be adjusted by utilizing the facial feature information and the eyeball feature information to obtain the target expression model.

7. The electronic device according to claim 6, wherein determining the corresponding expression classification according to the facial image comprises:
   inputting the facial image into a preset expression recognition model to determine the expression classification, wherein the expression recognition model is a neural network model.

8. The electronic device according to claim 6, wherein adjusting the corresponding parameters of the expression model to be adjusted by utilizing the facial feature information and the eyeball feature information to obtain the target expression model comprises:
adjusting facial feature parameters to be adjusted of the expression model to be adjusted to match with the facial feature information, and adjusting eyeball feature parameters of the expression model to be adjusted to match with the eyeball feature information, to obtain the target expression model.

9. The electronic device according to claim 6, wherein determining the corresponding expression model to be adjusted based on the expression classification comprises:
determining a plurality of corresponding selectable expression models by utilizing the expression classification;
controlling to render the plurality of selectable expression models;
acquiring a selecting instruction of the user for selecting the expression model to be adjusted from the plurality of selectable expression models;
determining the expression model to be adjusted based on the selecting instruction.

10. The electronic device according to claim 9, wherein determining the plurality of corresponding selectable expression models by utilizing the expression classification comprises:
determining corresponding facial proportion information according to the facial image;
determining the plurality of selectable expression models according to the facial proportion information and an expression model library corresponding to the expression classification.

11. A non-transient computer-readable storage medium having stored thereon computer programs which, when executed by a processor, implement a method, the method comprises:
acquiring a facial image and eyeball feature information of a user;
determining a corresponding expression classification according to the facial image;
determining a corresponding expression model to be adjusted based on the expression classification;
adjusting corresponding parameters of the expression model to be adjusted by utilizing the facial image and the eyeball feature information to obtain a target expression model,
wherein adjusting the corresponding parameters of the expression model to be adjusted by utilizing the facial image and the eyeball feature information to obtain the target expression model comprises:
determining corresponding facial feature information according to the facial image, wherein the facial feature information includes any one or more of: information of a distance between angulus orises at two sides, and information of a vertical distance between an angulus oris at one side or angulus orises at two sides and a labial peak;
adjusting the corresponding parameters of the expression model to be adjusted by utilizing the facial feature information and the eyeball feature information to obtain the target expression model.

12. The non-transient computer-readable storage medium according to claim 11, wherein determining the corresponding expression classification according to the facial image comprises:
inputting the facial image into a preset expression recognition model to determine the expression classification, wherein the expression recognition model is a neural network model.

13. The non-transient computer-readable storage medium according to claim 12, wherein adjusting the corresponding parameters of the expression model to be adjusted by utilizing the facial feature information and the eyeball feature information to obtain the target expression model comprises:
adjusting facial feature parameters to be adjusted of the expression model to be adjusted to match with the facial feature information, and adjusting eyeball feature parameters of the expression model to be adjusted to match with the eyeball feature information, to obtain the target expression model.

14. The non-transient computer-readable storage medium according to claim 11, wherein determining the corresponding expression model to be adjusted based on the expression classification comprises:
determining a plurality of corresponding selectable expression models by utilizing the expression classification;
controlling to render the plurality of selectable expression models;
acquiring a selecting instruction of the user for selecting the expression model to be adjusted from the plurality of selectable expression models;
determining the expression model to be adjusted based on the selecting instruction.

15. The non-transient computer-readable storage medium according to claim 14, wherein determining the plurality of corresponding selectable expression models by utilizing the expression classification comprises:
determining corresponding facial proportion information according to the facial image;
determining the plurality of selectable expression models according to the facial proportion information and an expression model library corresponding to the expression classification.

* * * * *